United States Patent
Luo et al.

(10) Patent No.: US 8,757,260 B2
(45) Date of Patent: Jun. 24, 2014

(54) DEGRADABLE PERFORATION BALLS AND ASSOCIATED METHODS OF USE IN SUBTERRANEAN APPLICATIONS

(75) Inventors: Hongyu Luo, Duncan, OK (US); Dwight D. Fulton, Duncan, OK (US)

(73) Assignee: Halliburton Energy Services, Inc., Houston, TX (US)

(*) Notice: Subject to any disclaimer, the term of this patent is extended or adjusted under 35 U.S.C. 154(b) by 583 days.

(21) Appl. No.: 12/378,083

(22) Filed: Feb. 11, 2009

(65) Prior Publication Data
US 2010/0200235 A1  Aug. 12, 2010

(51) Int. Cl.
*E21B 33/13* (2006.01)
*C09K 8/50* (2006.01)

(52) U.S. Cl.
USPC .......... 166/281; 166/282; 166/283; 166/294; 166/295; 166/307; 166/308.2; 166/308.6; 507/131; 507/138; 507/244; 507/265; 507/922

(58) Field of Classification Search
USPC .......... 507/265, 266, 267; 166/283, 191, 284
See application file for complete search history.

(56) References Cited

U.S. PATENT DOCUMENTS

| | | | | |
|---|---|---|---|---|
| 2,642,142 A * | 6/1953 | Clark | | 166/281 |
| 2,935,129 A * | 5/1960 | Allen et al. | | 166/308.3 |
| 4,716,964 A * | 1/1988 | Erbstoesser et al. | | 166/284 |
| 5,990,051 A * | 11/1999 | Ischy et al. | | 507/204 |
| 6,372,378 B1 | 4/2002 | Warner et al. | | 429/120 |
| 6,380,138 B1 * | 4/2002 | Ischy et al. | | 507/204 |
| 7,625,846 B2 * | 12/2009 | Cooke, Jr. | | 507/260 |
| 7,786,051 B2 * | 8/2010 | Lange et al. | | 507/219 |
| 2004/0106525 A1 * | 6/2004 | Willberg et al. | | 507/200 |
| 2007/0107908 A1 * | 5/2007 | Vaidya et al. | | 166/376 |
| 2007/0169935 A1 | 7/2007 | Akbar et al. | | |
| 2008/0093073 A1 | 4/2008 | Bustos et al. | | |
| 2008/0142222 A1 * | 6/2008 | Howard et al. | | 166/295 |
| 2008/0196896 A1 * | 8/2008 | Bustos et al. | | 166/281 |
| 2008/0318812 A1 * | 12/2008 | Kakadjian et al. | | 507/221 |
| 2009/0065207 A1 * | 3/2009 | Shenoy et al. | | 166/278 |
| 2013/0292123 A1 | 11/2013 | Murphree et al. | | |

OTHER PUBLICATIONS

International Search Report and Written Opinion for PCT/GB2010/000237 dated May 18, 2010.

\* cited by examiner

*Primary Examiner* — James Sayre
(74) *Attorney, Agent, or Firm* — McDermott Will & Emery LLP; Craig W. Roddy

(57) ABSTRACT

Methods and compositions that include a method of treating a subterranean formation comprising the steps of providing a carrier fluid comprising degradable balls that comprise a carboxylic acid, a fatty alcohol, a fatty acid salt, a fatty ester, a fatty acid salt, or a combination thereof, and introducing the carrier fluid to the subterranean formation during a treatment.

22 Claims, 2 Drawing Sheets

DEGRADABLE PERFORATION BALLS AND ASSOCIATED METHODS OF USE IN SUBTERRANEAN APPLICATIONS

BACKGROUND

The present invention relates to degradable balls, methods for their manufacture and methods for use in temporarily sealing perforations in subterranean well bore applications. In particular, at least in some embodiments, the present invention relates to perforation balls that comprise carboxylic acids, fatty alcohols, fatty acid salts, or esters.

"Perforation balls" are substantially spherical balls that may be used to substantially plug perforations during a hydraulic fracturing or acidizing stimulation treatment, or for any other fluid injection treatment, typically for the purpose of diverting flow of the treatment fluid (e.g., the fracturing fluid or the acidic treatment fluid) to other zones of interest within the formation. Most commercially available ball sealers are either a solid material or will have a solid, rigid core which resists extrusion into or through a perforation in the formation and an outer covering sufficiently compliant to seal, or significantly seal, the perforation. The ball sealers should not be able to penetrate the perforation since penetration would block flow through the perforation and could result in permanent damage to the flow characteristics of the well. Commercially available ball sealers are typically spherical with a hard, solid core made from nylon, phenolic, syntactic foam, or aluminum. The solid cores may be covered with rubber to protect them from solvents and to enhance their sealing capabilities.

It is common practice in completing oil and gas wells to set a string of pipe, known as casing, in the well and use a cement sheath around the outside of the casing to isolate the various formations penetrated by the well. To establish fluid communication between the hydrocarbon-bearing formations and the interior of the casing, the casing and cement sheath are perforated, typically using a perforating gun or similar apparatus. At various times during the life of the well, it may be desirable to increase the production rate of hydrocarbons using appropriate treatment fluids such as acids, water-treatment fluids, solvents or surfactants. If only a short, single pay zone in the well has been perforated, the treating fluid will flow into the pay zone where it is needed. As the length of the perforated pay zone or the number of perforated pay zones increases, the placement of the treating or stimulation fluid in the regions of the pay zones where it is needed becomes more difficult. For instance, the strata having the highest permeability will most likely consume the major portion of a given stimulation treatment, leaving the least permeable strata virtually untreated.

Generally, the ball sealers are pumped into the well bore along with the formation treating fluid and are carried down the well bore and onto the perforations by the flow of the fluid through the perforations into the formation. The balls seat upon the opening to the perforations receiving the majority of fluid flow and, once seated, are held there by the pressure differential across the perforations. The ball sealers are injected at the surface and transported downhole by a treating fluid. Other than a ball injector and possibly a ball catcher, no special or additional treating equipment is required. Some of the advantages of utilizing ball sealers as a diverting agent include ease of use, positive shutoff, no involvement with the formation, and low risk of incurring damage to the well. Ball sealers are typically designed to be chemically inert in the environment to which they are exposed; to effectively seal, yet not extrude into the perforations; and to release from the perforations when the pressure differential into the formation is relieved.

Most perforation balls are made with materials that are stable under downhole conditions, and thus, following a treatment, need to be recovered from the well bore or otherwise removed from the treatment interval. Perforation balls which have a density greater than that of the wellbore fluid, called "sinkers", may be flowed off the perforation openings and allowed to fall into the bottom of the wellbore. This may be undesirable because the accumulation of balls in the bottom of the well may hamper or prevent future production or service work on the well. Balls which have a density less than that of the wellbore fluid, or "floaters", may be flowed back to the surface and captured for possible reuse. This clean-up activity may be undesirable as it can delay further operations at the well and adds complications to the well treatment process. It is desirable to avoid either of these processes, and it is desirable that the perforation balls degrade downhole in such a manner as to not form undesirable products that may negatively impact any operations. More particular, it is desirable that such balls degrade in a predictable manner, typically within a few hours or days.

Commercially available degradable perforation balls are not satisfactory, inter alia, because of their limited temperature range usability. For lower temperature ranges, these are usually made from polyvinyl alcohol ("PVA") and/or polyvinyl acetate ("PVAC"). For higher temperature applications, balls may be made from blends of polyethylene oxide ("PEO"), poly(propylene oxide) ("PPO"), and polylactic acid ("PLA"). Perforation balls made from these materials may soften and become ineffective or transform into an undesirable material in certain conditions. As a result, they may become ineffective as perforation sealers. Further, under these conditions, the polymeric residue of these perforation balls may be forced into the perforation tunnels, plugging them and reducing conductivity of the formation. This is undesirable.

SUMMARY

The present invention relates to degradable balls, methods for their manufacture and methods for use in temporarily sealing perforations in subterranean well bore applications. In particular, at least in some embodiments, the present invention relates to perforation balls that comprise carboxylic acids, fatty alcohols, fatty acid salts, or esters.

In one embodiment, the present invention provides a method of treating a subterranean formation comprising the steps of providing a carrier fluid comprising degradable balls that comprise a carboxylic acid, a fatty alcohol, a fatty acid salt, a fatty ester, a fatty acid salt, or a combination thereof, and introducing the carrier fluid to the subterranean formation during a treatment.

In another embodiment, the present invention provides a method of temporarily sealing off perforations comprising the steps of providing a carrier fluid comprising degradable balls that comprise a carboxylic acid, a fatty alcohol, a fatty acid salt, a fatty ester, a fatty acid salt, or a combination thereof, introducing the carrier fluid to the subterranean formation during a treatment, allowing the carrier fluid to penetrate at least a portion of the perforation, allowing the degradable balls to divert at least a portion of the treatment fluid, and allowing the degradable balls to degrade in the subterranean formation such that the perforation is re-opened.

In yet another embodiment, the present invention provides a method of making a degradable ball composition comprising a carboxylic acid, a fatty alcohol, a fatty acid salt, a fatty ester, a fatty acid salt, or a combination thereof comprising the steps of forming a thermoplastic mass, and allowing the thermoplastic mass to cool as to form a degradable ball that is introduced in subterranean treatments by a carrier fluid.

The features and advantages of the present invention will be readily apparent to those skilled in the art. While numerous changes may be made by those skilled in the art, such changes are within the spirit of the invention.

BRIEF DESCRIPTION OF THE DRAWINGS

These drawings illustrate certain aspects of some of the embodiments of the present invention, and should not be used to limit or define the invention.

DESCRIPTION OF THE PREFERRED EMBODIMENTS

The present invention relates to degradable balls, methods for their manufacture and methods for use in temporarily sealing perforations in subterranean well bore applications. In particular, at least in some embodiments, the present invention relates to perforation balls that comprise carboxylic acids, fatty alcohols, fatty acid salts, or esters.

Figure 2:
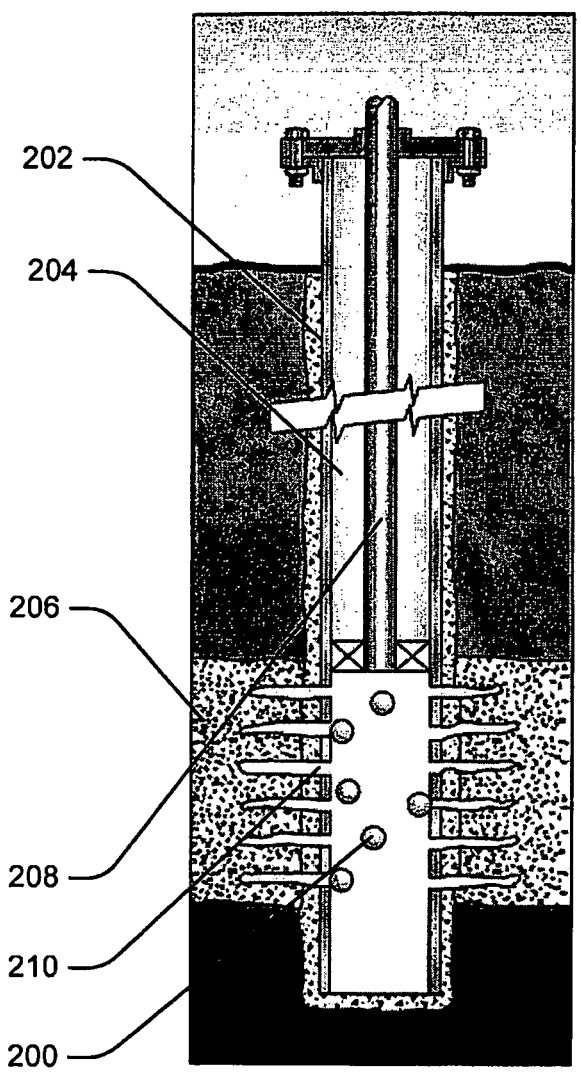
FIG. 2 illustrates the hypothetical flow of examples of certain embodiments of perforation balls of the present invention in a downhole environment to seal perforations.

The degradable balls of the present invention may flow in a downhole environment to seal off perforations as shown in FIG. 2. Referring now to FIG. 2, the perforation balls 200 in accordance with one embodiment of the present invention may flow through the wellbore 202 and casing 204 to the zone of interest 206 while being pushed through a workstring 208 into the perforation 210.

The majority of wells have been completed at depths less than 15,000 ft and as a result most commercially available ball sealers are not designed to perform at temperatures and at pressures commonly associated with wells of greater depths. In recent years, however, technological developments have enabled the oil and gas industry to drill and complete wells at depths exceeding 15,000 ft., which will often have higher temperatures and pressures. In addition to the high temperatures and pressures, wells completed at these depths often produce fluids like carbon dioxide ($CO_2$) or hydrogen sulfide ($H_2S$), and the stimulation fluid used may be a solvent like hydrochloric acid (HCl). Thus, conducting a stimulation treatment using ball sealers in deep, hostile environment wells requires ball sealers capable of withstanding high pressures and temperatures while exposed to gases and solvents. The ball sealers must also resist changes in density to ensure satisfactory seating efficiency during a stimulation treatment.

Of the many potential advantages of the present invention (many of which are not alluded to herein), is the fact that these perforation balls may be used in subterranean applications involving temperature ranges of up to 250° F. or more, depending on the particular composition employed. Some of the disclosed materials have higher melting temperatures and may be used in higher temperature applications, for example, up to 400° F. or more; the temperature limitations of the system may depend on the melting points of the degradable material forming the degradable perforation balls of the present invention. Additionally, these perforation balls should have sufficient strength at these temperature ranges to hold up to the differential pressures present in the well bore during a stimulation treatment or any other injection treatment. Moreover, upon degradation, the perforation balls of the present invention should not leave an undesirable residue in the formation.

Similarly, the degradable perforation balls of the present invention may operate at differential pressures up to about 3,000 psi, including from about 500 psi to about 3,000 psi, and more preferably from about 1,000 psi to about 2,000 psi.

These compositions are useful in subterranean formations for diverting well treatment fluids in a single interval or in multiple intervals of a subterranean formation having varying permeability and/or injectivity during a hydraulic fracturing or other well treatment operation. In using the degradable perforation balls of the present invention in fracturing or other treatment processes, the ball sealer inter alia acts by seating itself in the perforations in the well bore casing and deflecting the treating fluid to unsealed portions of the perforated interval. Degradable perforation balls then dissolve over time, and generally do not require an additional step of retrieving them from the wellbore. The perforation balls in the present invention may be degradable in formation fluids including hydrocarbon and aqueous fluids to facilitate self-cleanup after service, whereas polymeric materials might only degrade in aqueous fluids. For example, PLA and PVA are difficult to degrade in hydrocarbon.

The term "carrier fluid" as used herein refers to oil or water based fluid. The term also encompasses carrier fluids that are comprised of gases such as carbon dioxide or nitrogen in large or small concentrations. Such fluids may be used to transport materials, such as perforation balls or proppant particulates, downhole.

In embodiments described and disclosed herein, the use of the term "introducing" includes pumping, injecting, pouring, releasing, displacing, spotting, circulating, or otherwise placing a fluid or material within a well, well bore, or subterranean formation using any suitable manner known in the art.

The term "degradable" as used herein in reference to the perforation balls of the present invention means that a perforation ball is degradable due, inter alia, to chemical and/or radical degradation processes such as hydrolysis or oxidation. The term "degrade," as used herein, means to lower in character or quality; to debase. For example, a perforation ball may be said to have degraded when it has undergone a chemical breakdown. Methods of degradation can include melting, hydrolysis, solventolysis, oxidation, or complete dissolution.

The term "diverting agent", as used herein, means and refers generally to an agent that functions to prevent, either temporarily or permanently, the flow of a fluid into a particular location, usually located in a subterranean formation, wherein the agent serves to seal the location and thereby cause the fluid to flow to a different location.

As used herein, the term "treatment," or "treating," refers to any subterranean operation performed in conjunction with a desired function and/or for a desired purpose. The term "treatment," or "treating," does not imply any particular action.

As used herein, the term "treatment fluid" refers generally to any fluid that may be used in a subterranean application in conjunction with a desired function and/or for a desired purpose. The term "treatment fluid" does not imply any particular action by the fluid or any component thereof.

The term "stimulation", as used herein, refers to productivity improvement or restoration operations on a well as a result of a hydraulic fracturing, acid fracturing, matrix acidizing, sand treatment, or other type of treatment intended to increase and/or maximize the well's production rate or its longevity, often by creating highly conductive reservoir flow paths.

The term "soluble," as used herein, means capable of being at least partially dissolved upon exposure to a suitable solvent such as well bore fluids at subterranean formation conditions.

The term "deformable," as used herein, means capable of being deformed or put out of shape. For example, a ball may be deformed when its shape is no longer spherical, such as when it deforms to assume the shape of a perforation opening. The deformation can be due at least in part to the differential pressure experienced by the ball between the well bore and the formation. It is an indication that the ball shape is flexible.

The term "substantially plug," as used herein, means to plug a perforation. The perforation can be considered substantially plugged if flow through the perforation is essentially stopped, or decreased by about 90% or more. In some instances, this can be estimated in a lab environment by placing a ball sealer in a temperature controlled pressure chamber against an opening representing a perforation tunnel and applying a flow rate, then measuring the differential pressure held by the ball as it seals against the opening and stops flow. Also, visual tests in a lab environment can be used to estimate that no fluid flows into a perforation.

While compositions and methods are described in terms of "comprising" various components or steps, the compositions and methods can also "consist essentially of" or "consist of" the various components and steps. When "comprising" is used in a claim, it is open-ended.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claim, each numerical parameter should at least be construed in light of the number of reported significant digits and by applying ordinary rounding techniques.

One or more illustrative embodiments incorporating the invention disclosed herein are presented below. Not all features of an actual implementation are described or shown in this application for the sake of clarity. It is understood that in the development of an actual embodiment incorporating the present invention, numerous implementation-specific decisions must be made to achieve the developer's goals, such as compliance with system-related, business-related, government-related and other constraints, which vary by implementation and from time to time. While a developer's efforts might be complex and time-consuming, such efforts would be, nevertheless, a routine undertaking for those of ordinary skill the art having benefit of this disclosure.

The degradable perforation balls of the present invention comprise at least one degradable material selected from the group consisting of carboxylic acid, fatty alcohol, fatty acid salts, fatty ester, or a combination thereof. In some embodiments, the degradable perforation balls of the present invention may have a diameter in the range of about 5/8 inches (about 1.58 cm) to about 1¼ inches (about 3.18 cm) with densities ranging from about 0.7 g/cc to 1.5 g/cc.

The carboxylic acids that are suitable for use in the degradable perforation balls of the present invention include, but are not limited to, such carboxylic acids as: sebacic acid (also known as dedanedioic acid), which is believed to have a melting point ("M.P.") of about 133° C. (271° F.) and is insoluble in water at room temperature); stearic acid (also known as octadecanoic acid, which has a M.P. of 156° C. (313° F.), and is a slightly dissolvable fatty acid); phthalic acid (which has a melting point of 210° C. (410° F.), a and is slightly soluble in water at room temperature); isophthalic acid (which has a melting point of 300° C. (572° F.), and is insoluble in water at room temperature); phthalic acid (which has a melting point of 345° C. (653° F.), and is insoluble in water at room temperature); adipic acid (which has a melting point of 152° C. (306° F.) and is slightly soluble in water at room temperature); pamoic acid (which has a melting point greater than 300° C. (572° F.) and is insoluble in water at room temperature); suberic acid (which has a melting point of 143° C. (289° F.), and is slightly soluble in water at room temperature); succinic acid (which has a melting point of 187° C. (369° F.), and is moderately soluble in water at room temperature); traumatic acid (which has a melting point of 166° C. (331° F.), and is slightly soluble in water at room temperature); thapsic acid (which has a melting point of 125° C. (257° F.), and is slightly soluble in water at room temperature); and valporic acid (which has a melting point of 125° C. (257° F.), and is slightly soluble in water at room temperature). The carboxylic acids may also include, as examples: azelaic acid (HOOC—$(CH_2)_7$—COOH, M.P. 107° C. (225° F.), moderately soluble in water); camphoric acid ($C_{10}H_{16}O_4$, M.P. 185° C. (365° F.), moderately soluble in water); campholic acid ($C_{10}H_{18}O_2$, M.P. 95° C. (203° F.), slightly soluble in water); muconic acid ($C_6H_6O_4$, M.P. 290° C. (554° F.), slightly soluble in water); undecanedioic acid ($C_{11}H_{20}O_4$, M.P. 110° C. (230° F.), slightly soluble in water); brassylic acid (M.P. 111° C. (232° F.), slightly soluble in water); melissic acid (M.P. 93° C. (199° F.), slightly soluble in water); p-toluic acid ($CH_3C_6H_4COOH$, M.P. 180° C. (356° F.), slightly soluble in water); sorbic acid ($CH_3CH$=$CHCH$=$CHCOOH$, M.P. 134° C. (273° F.), slightly soluble in water); dodecanedioc acid ($C_{12}H_{22}O_4$, M.P. 128° C. (262° F.), slightly soluble in water); tetradecanedioic acid ($C_{14}H_{26}O_4$, M.P. 127° C. (261° F.), slightly soluble in water); and α-Aleuritic acid ($C_{16}H_{32}O_5$, M.P. 97° C. (207° F.), moderately soluble in water) Mixtures of these may be suitable as well. These melting points and solubilities are from the HANDBOOK OF AQUEOUS SOLUBILITY DATA, by Samuel H. Yalkowsky and Yan He, Publisher: CRC Press, Copyright: 2003. These materials may be used in any mixture or combination.

Suitable fatty alcohols and fatty esters and that may be used in the degradable perforation balls of the present invention include, but are not limited to, such fatty alcohols and esters as: montanyl alcohol (which has a melting point of 83° C. (171° F.); tert-butylhydroquinone (which has a melting point of 128° C. (262° F.), and is insoluble in water); cholesterol (which has a melting point of 149° C. (300° F.), and has a solubility of 0.095 mg/L of water at 30° C. (86° F.)); cholesteryl nonanoate (which has a melting point of about 80° C. (176° F.), and is insoluble in water); benzoin (which has a melting point of about 137° C. (279° F.), and is slightly insoluble in water); borneol (which has a melting point of about 208° C. (406° F.), and is slightly insoluble in water); exo-norborneol (which has a melting point of 125° C. (257° F.) and; glyceraldehyde triphenylmethanol (which has a melting point of 164.2° C. (324° F.), and is insoluble in water); propyl gallate (which has a melting point of 150° C. (302° F.)); and dimethyl terephthalate ("DMT") (which has a melting point of 141° C. (286° F.), and limited solubility in water which is more soluble than "slightly"). If solubilities are not given, then that data is not available. The fatty alcohols may also include, as examples: camphor ($C_{10}H_{16}O$, with a melting point of about 180° C. (356° F.), slightly soluble in water); cholecalciferol (a.k.a. vitamin D3, $C_{27}H_{44}O$, with a melting point of about 85° C. (185° F.), slightly soluble in water); ricinoleyl alcohol ($C_{18}H_{36}O_2$, with a melting point of about 89° C. (192° F.)); 1-Heptacosanol ($C_{27}H_{56}O$, with a melting point of about 82° C. (180° F.)); 1-Tetratriacontanol (a.k.a. geddyl alcohol $C_{34}H_{70}O$, with a melting point of about 92° C. (198° F.)); 1-Dotriacontanol (lacceryl alcohol, $C_{32}H_{66}O$, with a melting point of about 89° C. (192° F.)); 1-Hentriacontanol (melissyl alcohol, $C_{31}H_{64}O$, with a melting point of about 87° C. (189° F.)); 1-Tricontanol (myricyl alcohol, $C_{30}H_{62}O$, with a melting point of about 87° C. (189° F.)); 1-Nonacosanol ($C_{29}H_{60}O$, with a melting point of about 85° C. (185° F.)); 1-Octasanol (a.k.a montanyl alcohol, $C_{28}H_{58}O$, with a melting point of about 84° C. (183° F.)); 1-Hexacosanol (ceryl alcohol, $C_{26}H_{54}O$, with a melting point of about 81° C. (178° F.)); 1,14-Tetradecanediol ($C_{14}H_{30}O_2$, with a melting point of about 85° C. (185° F.)); 1,16-Hexadecanediol, ($C_{16}H_{34}O_2$, with a melting point of about 91° C. (196° F.)); 1,17-Heptadecanediol, ($C_{18}H_{36}O_2$, with a melting point of about 96° C. (205° F.)); 1,18-Octadecanediol ($C_{19}H_{38}O_2$, with a melting point of about 98° C. (208° F.)); 1,19-Nonadecanediol ($C_{20}H_{40}O_2$, with a melting point of about 101° C. (214° F.)); 1,20-Eicosanediol ($C_{20}H_{42}O_2$, with a melting point of about 102° C. (216° F.)); 1,21-Heneicosanediol ($C_{21}H_{44}O_2$, with a melting point of about 105° C. (221° F.)); and 1,22-Docosanediol ($C_{22}H_{46}O_2$, with a melting point of about 106° C. (223° F.)). Mixtures of these may be suitable as well. These melting points and solubilities are from the HANDBOOK OF AQUEOUS SOLUBILITY DATA, by Samuel H. Yalkowsky and Yan He, Publisher: CRC Press, Copyright: 2003. These materials may be used in any mixture or combination.

The described esters are generally reaction product of alcohols and acids. Examples include but are not limited to prednisolone acetate ($C_{26}H_{36}O_6$, M.P. 233° C. (451° F.), slightly soluble in water), cellobiose tetraacetate (slightly soluble in water), terephthalic acid dimethyl ester, ($C_{10}H_{10}O_4$, M.P. 140° C. (284° F.), slightly soluble in water). Other examples of esters can be found in ester waxes such as Carnauba wax and Ouricouri wax. Carnauba wax contains ceryl palmitate, myricyl ceretate, myricyl alcohol ($C_{30}H_{61}OH$) along with other high molecular weight esters and alcohols. Olho wax is a pure whitish gray carnauba wax obtained from young leaves. Refined olho wax is called flora wax. Palha wax is a brownish wax obtained from older leaves. Palha wax can be emulsified with water to form chalky wax. Castor wax like compound obtained by the controlled hydrogenation of pure castor oil. The principle constituent is glycerol tris 12-hydroxystearate, also known as opalwax with a melting point in the range from about 78° C. (172° F.) to about 85° C. (185° F.).

Prolamins may also be used in the present invention. Prolamins are a group of plant storage proteins having a high proline and glutamine content and found in the seeds of cereal grains. The prolamins that are suitable for use in the degradable perforation balls of the present invention include, but are not limited to, such prolamins as: gliadin, hordein, secalin, zein and avenin. Prolamins are generally soluble only in strong alcohol solutions and have a melting point in the range from about 160° C. (320° F.) to about 200° C. (392° F.).

The fatty acid salts that are suitable for use in the degradable perforation balls of the present invention include, but are not limited to, such fatty acid salts as: sucrose distearate, calcium stearate, glyceryl monostearate, zinc stearate and magnesium stearate which is a hydrophobic substance with a melting point of 88° C. (190° F.).

In accordance with the present invention, and in order to optimize the properties of the degradable perforation balls of the present invention, the carboxylic acids, fatty alcohols, fatty acid salts, or fatty esters should be present in such a weight ratio that the desired properties of the final product are achieved by the combination. In some embodiments, each component will be present at least 1% by weight.

The properties of the degradable perforation balls of the present invention should typically be so chosen that the degradable perforation balls have a density from about 0.70 g/cc to about 1.5 g/cc. Perforation ball densities which can be formulated and used in accordance with the present invention include, for example, about 0.7 g/cc, about 0.75 g/cc, about 0.80 g/cc, about 0.85 g/cc, about 0.90 g/cc, about 0.95 g/cc, about 1.00 g/cc, about 1.10 g/cc, about 1.20 g/cc, about 1.30 g/cc, about 1.40 g/cc, and about 1.50 g/cc, as well as densities and density ranges between any two of these values, e.g., a density from about 0.80 g/cc to about 1.10 g/cc, or a density of about 1.05 g/cc.

To control degradation rates, it may be desirable to include additional components in the degradable perforation balls of the present invention. Examples include poly(vinyl acetate), poly(vinyl alcohol), and combinations thereof. Other examples of such components may include but are not limited to, degradable polymers, dehydrated compounds, and mixtures thereof. Such degradable materials are capable of undergoing an irreversible degradation downhole. The term "irreversible" as used herein means that the degradable material, once degraded downhole, should not recrystallize or reconsolidate, e.g., the degradable material should degrade in situ but should not recrystallize or reconsolidate in situ.

Suitable examples of degradable polymers that may be used in accordance with the present invention include, but are not limited to, homopolymers, random, block, graft, and star- and hyper-branched polymers. Specific examples of suitable polymers include polysaccharides such as dextran or cellulose; chitin; chitosan; proteins; aliphatic polyesters; poly(lactide); poly(glycolide); poly(ε-caprolactone); poly(hydroxybutyrate); poly(anhydrides); aliphatic polycarbonates; poly(ortho esters); poly(amino acids); poly(ethylene oxide); and polyphosphazenes. Polyanhydrides are another type of particularly suitable degradable polymer useful in the present invention. Examples of suitable polyanhydrides include poly(adipic anhydride), poly(suberic anhydride), poly(sebacic anhydride), and poly(dodecanedioic anhydride). Other suitable examples include but are not limited to poly(maleic anhydride) and poly(benzoic anhydride). One skilled in the art will recognize that plasticizers may be included in forming suitable polymeric degradable materials of the present invention. The plasticizers may be present in an amount sufficient to provide the desired characteristics, for example, increased compatibility of the melt blend components, improved processing characteristics during the blending and processing steps, and control and regulation of the sensitivity and degradation of the polymer by moisture.

Suitable dehydrated compounds are those materials that will degrade over time when rehydrated. For example, a particulate solid dehydrated salt or a particulate solid anhydrous borate material that degrades over time may be suitable. Specific examples of particulate solid anhydrous borate materials that may be used include but are not limited to anhydrous sodium tetraborate (also known as anhydrous borax), and anhydrous boric acid. These anhydrous borate materials are only slightly soluble in water. However, with time and heat in a subterranean environment, the anhydrous borate materials react with the surrounding aqueous fluid and are hydrated. The resulting hydrated borate materials are substantially soluble in water as compared to anhydrous borate materials and as a result degrade in the aqueous fluid.

Blends of certain degradable materials and other compounds may also be suitable. One example of a suitable blend of materials is a mixture of poly(lactic acid) and sodium borate where the mixing of an acid and base could result in a neutral solution where this is desirable. Another example would include a blend of poly(lactic acid) and boric oxide. In choosing the appropriate degradable material or materials, one should consider the degradation products that will result. The degradation products should not adversely affect subterranean operations or components. The choice of degradable material also can depend, at least in part, on the conditions of the well, e.g., well bore temperature. For instance, lactides have been found to be suitable for lower temperature wells, including those within the range of 60° F. to 150° F., and polylactides have been found to be suitable for well bore temperatures above this range. Poly(lactic acid) and dehydrated salts may be suitable for higher temperature wells. Also, in some embodiments a preferable result is achieved if the degradable material degrades slowly over time as opposed to instantaneously. In some embodiments, it may be desirable when the degradable material does not substantially degrade until after the degradable material has been substantially placed in a desired location within a subterranean formation.

In alternative embodiments of the present invention, the specific properties of the degradable perforation balls of the present invention can be further controlled by the addition of one or more finely graded filler materials. The addition of such filler materials advantageously allows the density of the ball sealer product to be expanded as required by the circumstances and/or specific needs of the user. Finely graded filler materials, in accordance with the present disclosure, refers to a broad range of finely powdered materials that are substantially non-reactive in a downhole, subterranean environment, and typically have a size from about 10 mesh to about 350 mesh, and more typically from about 20 mesh to about 325 mesh. In accordance with the present invention, examples of suitable filler materials include, but are not limited to, natural organic materials, inorganic minerals, silica materials and powders, ceramic materials, metallic materials and powders, synthetic organic materials and powders, mixtures thereof, and the like. Typical examples of such finely graded filler materials suitable for use herein include but are not limited to sodium chloride, sugar, silica flour (such as 325 mesh Silica Flour available from Santrol, Fresno, Tex.), calcium carbonate fillers (such as that available in a variety of mesh sizes from Vulcan Minerals Inc., Newfoundland, Calif.), and fumed silica (such as that available from PT Hutchins Co., Ltd., Los Angeles, Calif.).

Natural organic materials suitable for use as filler materials include, but are not limited to, finely ground nut shells such as walnut, brazil nut, and macadamia nut, as well as finely ground fruit pits such as peach pits, apricot pits, or olive pits, and any resin impregnated or resin coated version of these.

Silica materials and powders suitable for use as filler materials with the present invention include, but are not limited to, glass spheres and glass microspheres, glass beads, glass fibers, silica quartz sand, sintered Bauxite, silica flour, silica fibers, and sands of all types such as white or brown, silicate minerals, and combinations thereof. Typical silica sands suitable for use include Northern White Sands (Fairmount Minerals, Chardon, Ohio), Ottawa, Jordan, Brady, Hickory, Ariz., St. Peter, Wonowoc, and Chalfort. In the case of silica or glass fibers being used, the fibers can be straight, curved, crimped, or spiral shaped, and can be of any grade, such as E-grade, S-grade, and AR-grade. Typical silicate minerals suitable for use herein include the clay minerals of the Kaolinite group (kaolinite, dickite, and nacrite), the Montmorillonite/smectite group (including pyrophyllite, talc, vermiculite, sauconite, saponite, nontronite, and montmorillonite), and the Illite (or clay-mica) group (including muscovite and illite), as well as combinations of such clay minerals.

Ceramic materials suitable for use with the methods of the present invention include, but are not limited to, ceramic beads; clay powders; finely crushed spent fluid-cracking catalysts (FCC) such as those described in U.S. Pat. No. 6,372,378; finely crushed ultra lightweight porous ceramics; finely crushed economy lightweight ceramics; finely crushed lightweight ceramics; finely crushed intermediate strength ceramics.

Metallic materials and powders suitable for use with the embodiments of the present invention include, but are not limited to, transition metal powders, transition metal dust, and the like.

Synthetic organic materials and powders are also suitable for use as filler materials with the present invention. Examples of suitable synthetic materials and powders include, but are not limited to, plastic particles, beads or powders, nylon beads, nylon fibers, nylon pellets, nylon powder, SDVB (styrene divinyl benzene) beads, SDVB fibers, TEFLON® fibers, carbon fibers such as PANEX™ carbon fibers from Zoltek Corporation (Van Nuys, Calif.) and KYNOL™ carbon fibers from American Kynol, Inc. (Pleasantville, N.Y.), KYNOL™ novoloid "S-type" fillers, fibers, and yarns from American Kynol Inc. (Pleasantville, N.Y.), and carbon powders/carbon dust (e.g., carbon black).

The degradable perforation balls of the present invention, as described herein, are degradable following completion of their use in sealing perforations inside cased wells. By degradable, it is meant that the ball sealer compositions as described herein break-down after a period of time and dissolve in well bore fluids, thereby minimizing and/or eliminating problems during reservoir fluid production and with further well bore stimulations, further use of aqueous well bore treatment fluids, and well stimulation equipment. These deformable and degradable ball sealers, according to the present invention, are soluble in, for example, aqueous based fluid as well as hydrocarbon fluids, under acidic, neutral, and basic pH environments. Suitable hydrocarbon fluids which the ball sealers of the present invention are soluble in include diesel, kerosene, reservoir oil, and mixtures thereof. By "acidic pH", it is meant that the environment surrounding the ball sealers (e.g., the treating fluid) has a pH less than about 7, while by "neutral pH" it is meant that the environment surround the ball sealers has a pH of about 7 and "basic pH" means a pH of above about 7.

In embodiments of degradable perforation balls of the present invention, single and multiple intervals of a subterranean formation can be treated or stimulated in stages by successively introducing degradable perforation balls of the present invention. This is accomplished through sequential injection of treatment fluid stages interspersed with fluid stages containing the ball sealers, such that early fluid stages treat one or more intervals which are then sealed off with one injection of perforation balls, and subsequent intervals are treated and then sealed with continued alternating injection of treatment fluids and ball sealers.

The degradable perforation balls of the present invention can be manufactured using a number of processes, including melting and molding, hot press and the like. Solvent-based techniques may be suitable as well. Such processes allow the degradable perforation balls of the present invention to have any number of desired three-dimensional geometric shapes, including polygonal and spherical. Preferably, the degradable perforation balls of the present invention are substantially spherical in shape. However, it will be apparent to those of skill in the art that any of the commonly used shapes for use in oil field tubular pipes can be used in accordance with the present invention. Further, and in accordance herein, finely graded filler material can be added before injection molding, and the filler material and polymeric mixture blended together uniformly so as to obtained the final product with the desired density of the soluble ball sealer.

The process of the invention is practiced in a conventional injection molding machine. The mixture in particulate form is tumble blended with the master-batch until homogeneous. The blend is charged to the hopper of an injection molding machine which melts the resin under heat and pressure converting it to a flowable thermoplastic mass.

The nozzle of the injection molding machine is in liquid flow communication with a mold whose mold cavity or cavities is of substantially the same dimension as the final core. The molds are water cooled to a temperature of about 0° C. (32° F.) to about 18° C. (65° F.). and preferably to a temperature of about 2° C. (35° F.). to about 7° C. (45° F.). which is necessary to form a skin on the surface of the polymeric mass injected into the mold. Upon injection of the required amount of polymeric mixture in optional combination with one or more filler materials into the mold cavity, the mold is continuously cooled with water in order to maintain the mold cavity surface at the low temperature. The thermoplastic mass is held in the mold until a spherical mass of adequate strength is formed so that upon removal of the spherical mass from the mold, the mass does not collapse. Upon removal of the mass from the mold, the spree is cut with a small excess above the surface of the sphere to allow for shrinkage, and the formed ball core is placed in a water immersion bath at about 0° C. (32° F.). to about 18° C. (65° F.), and more preferably, at about 2° C. (35° F.). to about 7° C. (45° F.), for a period of time to substantially quench the ball. The minimum period of quenching time in the water bath is about 15 minutes. If the ball is not sufficiently cooled in the water bath, it does not shrink and an oversize product is obtained. After removal from the water bath, the balls are placed on a rack at ambient temperature.

Ball sealers in accordance with the present invention that may be formed from the above process to have dimensions substantially the same as the mold cavity, and such cores can be produced within tolerances of plus or minus 0.1% deviation in circumference and plus or minus 0.6% deviation in weight. The ball is typically characterized by a substantially smooth surface and a substantially spherical shape, although other polygonal shapes can be used. Further, and in accordance with the present invention, the ball sealers can be manufactured in any desired diameter/size, although the preferred diameters are about ⅝ inches (about 1.58 cm) and about 1¼ inches (about 3.18 cm) in diameter. For example, and in accordance with the present invention, substantially spherical ball sealers can have a diameter from about 0.2 inches (about 0.51 cm) to about 5.0 inches (about 12.7 cm), and more preferably from about 0.5 inches (about 1.27 cm) to about 2.0 inches (about 5.1 cm). As indicated above, while substantially spherical shapes have been specifically described, it will be apparent that other shapes consistent with oilfield operations and downhole geometry could be made and used in accordance with the present invention, including but not limited to polyhedrons (solids bounded by a finite number of plane faces, each of which is a polygon) such as "regular polyhedrons (tetrahedrons, hexahedrons, octahedrons, decahedrons, dodecahedrons, and icosahedrons), as well as non-regular polyhedra such as those polyhedrons consisting of two or more regular polyhedrons (e.g., 2 regular tetrahedrons), and semi-regular polyhedrons (those that are convex and all faces are regular polyhedrons), as well as well-known polyhedra such as pyramids.

Generally, the degradable perforation balls of the present invention can withstand the degradation effects of solvents common to oil and gas wells during a stimulation treatment or other injection treatment. They are also designed to resist changes in density during at least about an 8-hour period, although it is believed that longer periods of time could be endured. As mentioned previously, densities of the ball sealers of the present invention can range from about 0.70 g/cc to about 1.5 g/cc by varying the composition and the amount and type of finely graded filler material added to the composition. An optional coating can be applied to the balls if desired, (e.g., to protect the ball when exposed to HCl and similar harsh components during a stimulation treatment or treatment).

To facilitate a better understanding of the present invention, the following examples of certain aspects of some embodiments are given. In no way should the following examples be read to limit, or define, the entire scope of the invention.

EXAMPLES

Figure 1:
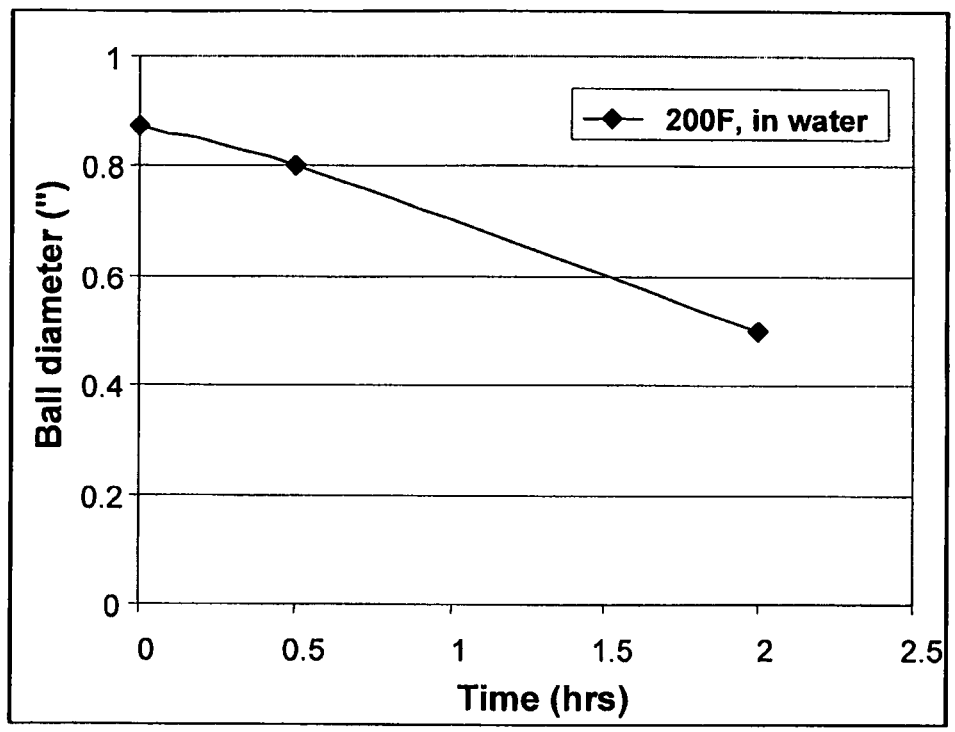
FIG. 1 relates to the dissolution of a ⅞ inches (about 2.22 cm) ball made of sebacic acid.

In one example, sebacic powder is melted and molded into a ⅞ inches (about 2.22 cm) diameter ball. FIG. 1 relates to the dissolution of a ⅞ inches (about 2.22 cm) ball made of sebacic acid. The ball weighs 6.47 grams and sank in water. The ball remains hard up to 200° F. The ball dissolves in hot water in the temperature range of about 180° F. to 210° F. with the dissolution rate increasing with temperature. In 200° F. water, the ball's diameter decreases to 0.8 inches (about 2.03 cm) in 0.5 hours and 0.5 inches (about 1.27 cm) in about 2 hours. The dissolution rate at 180° F. is considerably slower, with little diameter change in 1 hour. It is believed that such a degradable perforation ball would be useful in subterranean applications involving about 75° F. to about 550° F.

In another example, suberic acid and adipic acid made from melting their respective powders will dissolved in about 2 to about 3 hours at 175° F. while maintaining mechanical strength.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Moreover, the indefinite articles "a" or "an", as used in the claims, are defined herein to mean one or more than one of the element that it introduces. Also, the terms in the claims have their plain, ordinary meaning unless otherwise explicitly and clearly defined by the patentee.

What is claimed is:

1. A method comprising:
   providing a carrier fluid comprising degradable balls that comprise at least one carboxylic acid selected from the group consisting of: sebacic acid, stearic acid, pamoic acid, suberic acid, traumatic acid, thapsic acid, azelaic acid, camphoric acid, campholic acid, muconic acid, undecanedioic acid, brassylic acid, melissic acid, p-toluic acid, sorbic acid, dodecanedioc acid, tetradecanedioic acid, α-Aleuritic acid, and combinations thereof; and
   introducing the carrier fluid to a subterranean formation.

2. The method of claim 1 wherein the degradable balls have a diameter from about 0.2 inches (0.51 cm) to about 5 inches (12.7 cm).

3. The method of claim 1 wherein the subterranean formation has the temperature range of about 250° F. to about 550° F.

4. The method of claim 1 wherein the degradable balls are subjected to differential pressures from about 500 psi to about 3,000 psi.

5. The method of claim 1 wherein the degradable balls have a density from about 0.70 g/cc to about 1.5 g/cc.

6. The method of claim 1 wherein the degradable balls further comprise at least one fatty alcohol and/or one fatty ester selected from the group consisting of: montanyl alcohol, tert-butylhydroquinone, cholesterol, cholesteryl nonanoate, benzoin, borneol, exo-norborneol, glyceraldehyde triphenylmethanol, dimethyl terephthalate, camphor, cholecalciferol, ricinoleyl alcohol, 1-Heptacosanol, 1-Tetratriacontanol, 1-Dotriacontanol, 1-Hentriacontanol, 1-Tricontanol, 1-Nonacosanol, 1-Octasanol, 1-Hexacosanol, 1,14-Tetradecanediol, 1,16-Hexadecanediol, 1,17-Heptadecanediol, 1,18-Octadecanediol, 1,19-Nonadecanediol, 1,20-Eicosanediol, 1,21-Heneicosanediol, 1,22-Docosanediol, prednisolone acetate, cellobiose tetraacetate, terephthalic acid dimethyl ester, ceryl palmitate, myricyl ceretate, myricyl alcohol, gliadin, hordein, secalin, zein, and avenin.

7. The method of claim 1 wherein the degradable balls further comprise at least one fatty acid salt from the group consisting of: sucrose distearate, calcium stearate, glyceryl monostearate, zinc stearate, and magnesium stearate.

8. The method of claim 1 wherein the fatty acids, fatty alcohols, fatty acid salts, or esters present in the degradable balls comprise an amount greater than about 1% by weight.

9. The method of claim 1 wherein the carrier fluid comprises a water based liquid, an oil based liquid, a gas, and any combination thereof.

10. The method of claim 1 wherein the degradable balls further comprise filler materials.

11. The method of claim 10 wherein the filler materials comprise at least one material from the group consisting of: sodium chloride, sugar, silica flour, calcium carbonate, fumed silica, finely ground nut shells, finely ground fruit pits, glass spheres, glass microspheres, glass beads, glass fibers, silica quartz sand, sintered Bauxite, silica flour, silica fibers, sand, silicate minerals, clays, Kaolinite clays, smectite clays, Illite clays, ceramic beads; clay powders, finely crushed spent fluid-cracking catalysts, finely crushed ultra lightweight porous ceramics; finely crushed economy lightweight ceramics; finely crushed lightweight ceramics, finely crushed intermediate strength ceramics, transition metal powders, transition metal dust, plastic particles, nylon beads, nylon fibers, nylon pellets, nylon powder, SDVB (styrene divinyl benzene) beads, SDVB fibers, polytetrafluoroethylene fibers, carbon fibers, cured phenol-aldehyde novoloid "S-type" fillers, cured phenol-aldehyde novoloid "S-type" fibers, cured phenol-aldehyde novoloid "S-type" yarn, carbon powders, carbon dust, and any combination thereof.

12. A method of temporarily sealing off perforations comprising:
   providing a carrier fluid comprising degradable balls that comprise at least one selected from the group consisting of: a carboxylic acid, a fatty alcohol, a fatty acid salt, a fatty ester, and a combination thereof, wherein the carboxylic acid is selected from the group consisting of: sebacic acid, stearic acid, phthalic acid, isophthalic acid, adipic acid, pamoic acid, suberic acid, succinic acid, traumatic acid, thapsic acid, azelaic acid, camphoric acid, campholic acid, muconic acid, undecanedioic acid, brassylic acid, melissic acid, p-toluic acid, sorbic acid, dodecanedioc acid, tetradecanedioic acid, α-Aleuritic acid, and a combination thereof;
   introducing the carrier fluid to a subterranean formation during a treatment wherein the subterranean formation has the temperature range of about 250° F. to about 550° F.;
   introducing the carrier fluid to penetrate at least a portion of the perforation;
   diverting at least a portion of the treatment fluid with the degradable balls; and
   re-opening the perforation through degradation of the degradable balls in the subterranean formation.

13. The method of claim 12 wherein the degradable balls have a diameter from about 5/8 inches (1.58 cm) to about 1¼ inches (3.18 cm).

14. The method of claim 12 wherein the degradable balls are exposed to differential pressures from about 500 psi to about 3,000 psi.

15. The method of claim 12 wherein the degradable balls have a density from about 0.70 g/cc to about 1.5 g/cc.

16. The method of claim 12 wherein the fatty acids, fatty alcohols, fatty acid salts, or esters present in the degradable balls comprise an amount greater than about 1% by weight.

17. The method of claim 12 wherein the carrier fluid comprises a water-based liquid, an oil-based liquid, a gas, and combinations thereof.

18. The method of claim 12 wherein the portion of the fluid flow diverted is greater than about 90%.

19. The method of claim 12 wherein the degradable balls degrade in a time period ranging from about 1 hour to 72 hours.

20. The method of claim 12 wherein the degradable balls degrade by processes comprising melting, hydrolysis, solventolysis, complete dissolution, and combinations thereof.

21. A method comprising:
   providing a carrier fluid comprising degradable balls that comprise at least one material selected from the group consisting of: a carboxylic acid, a fatty alcohol, a fatty ester, or a combination thereof; and,
   introducing the carrier fluid to a subterranean formation wherein the subterranean formation has the temperature range of about 250° F. to about 550° F.

22. The method of claim 21 wherein the comprising degradable balls that comprise at least one carboxylic acid selected from the group consisting of: sebacic acid, stearic acid, pamoic acid, suberic acid, traumatic acid, thapsic acid, azelaic acid, camphoric acid, campholic acid, muconic acid, undecanedioic acid, brassylic acid, melissic acid, p-toluic acid, sorbic acid, dodecanedioc acid, tetradecanedioic acid, α-Aleuritic acid, and combinations thereof.

* * * * *